US012759825B2

(12) United States Patent
Egawa

(10) Patent No.: US 12,759,825 B2
(45) Date of Patent: Oct. 13, 2026

(54) CONVEYOR AND IMAGE FORMING APPARATUS

(71) Applicant: Tomohiro Egawa, Kanagawa (JP)

(72) Inventor: Tomohiro Egawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 208 days.

(21) Appl. No.: 18/633,599

(22) Filed: Apr. 12, 2024

(65) Prior Publication Data

US 2024/0343513 A1 Oct. 17, 2024

(30) Foreign Application Priority Data

Apr. 13, 2023 (JP) ................................ 2023-065675

(51) Int. Cl.
*B65H 5/06* (2006.01)
*B41J 13/03* (2006.01)

(52) U.S. Cl.
CPC .............. *B65H 5/068* (2013.01); *B41J 13/03* (2013.01); *B65H 2404/114* (2013.01); *B65H 2404/5322* (2013.01)

(58) Field of Classification Search
CPC .......... B41J 11/00; B41J 11/006; B41J 13/03; B65H 5/06; B65H 5/062; B65H 5/068; B65H 2404/1542; B65H 2404/5322; B65H 2404/19; B65H 2601/251; B65H 2601/254; B65H 2801/06
See application file for complete search history.

(56) References Cited

U.S. PATENT DOCUMENTS

| | | | | |
|---|---|---|---|---|
| 9,108,445 | B2 * | 8/2015 | Sakano | B41J 13/14 |
| 10,046,933 | B2 * | 8/2018 | Ohashi | G03G 15/657 |
| 10,308,046 | B2 | 6/2019 | Okumura | |
| 10,308,465 | B2 * | 6/2019 | Shimodaira | B65H 5/062 |
| 11,472,205 | B2 * | 10/2022 | Fujiwara | B65H 29/70 |
| 2013/0050380 | A1 | 2/2013 | Sakano | |
| 2019/0161299 | A1 | 5/2019 | Egawa et al. | |
| 2020/0255241 | A1 * | 8/2020 | Hirahara | B65H 9/166 |
| 2022/0281706 | A1 | 9/2022 | Kimura | |

FOREIGN PATENT DOCUMENTS

| | | |
|---|---|---|
| JP | 2000-086041 A | 3/2000 |
| JP | 2013-049238 A | 3/2013 |

OTHER PUBLICATIONS

Extended European Search Report issued Sep. 13, 2024 in European Patent Application No. 24167129.6, 7 pages.

* cited by examiner

*Primary Examiner* — Leslie A Nicholson, III
(74) *Attorney, Agent, or Firm* — XSENSUS LLP

(57) ABSTRACT

A conveyor includes multiple conveying rollers to convey a sheet in a conveyance direction, and the multiple conveying rollers: arranged in the conveyance direction; and shifted with each other in a width direction orthogonal to the conveyance direction.

20 Claims, 5 Drawing Sheets

FIG. 2B COMPARATIVE EXAMPLE

CONVEYOR AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-065675, filed on Apr. 13, 2023, in the Japan Patent Office, the entire disclosure of which is hereby incorporated by reference herein.

BACKGROUND

Technical Field

The present embodiment relates to a recording medium conveyor and an image forming apparatus and particularly relates to a recording medium conveyor including multiple rollers disposed dispersive to inhibit the surface of a sheet-shaped medium from having roller abrasions and an image forming apparatus including the recording medium conveyor.

Related Art

As an exemplary image forming apparatus, such as a printer, a facsimile machine, a copier, or a multifunction peripheral, there is an inkjet image forming apparatus that includes a recording head serving as a liquid discharge head that discharges droplets of recording liquid and causes, while conveying a sheet-shaped recording medium, droplets of recording liquid to be adhered to the recording medium to perform printing. Such an image forming apparatus includes multiple rollers for flat conveyance or curved conveyance of a sheet-shaped recording medium.

Such multiple rollers is disposed in multiple lines along a conveyance direction, such as flat conveyance and curved conveyance. In a case where multiple rollers is located on the same straight line in the conveyance direction, in response to slipping of the multiple rollers on the same straight line, a recording medium has belt-like overlaid abrasions thereon. If a recording medium has its surface abraded, as a disadvantage, an image formed on the surface by inkjetting on the downstream side in the conveyance direction is low in quality (belt-like unusual image).

SUMMARY

In an aspect of the present disclosure, a conveyor includes multiple conveying rollers to convey a sheet in a conveyance direction, and the multiple conveying rollers: arranged in the conveyance direction; and shifted with each other in a width direction orthogonal to the conveyance direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2B is a schematic perspective view of a recording medium conveyor according to a comparative example;

Figure 1:
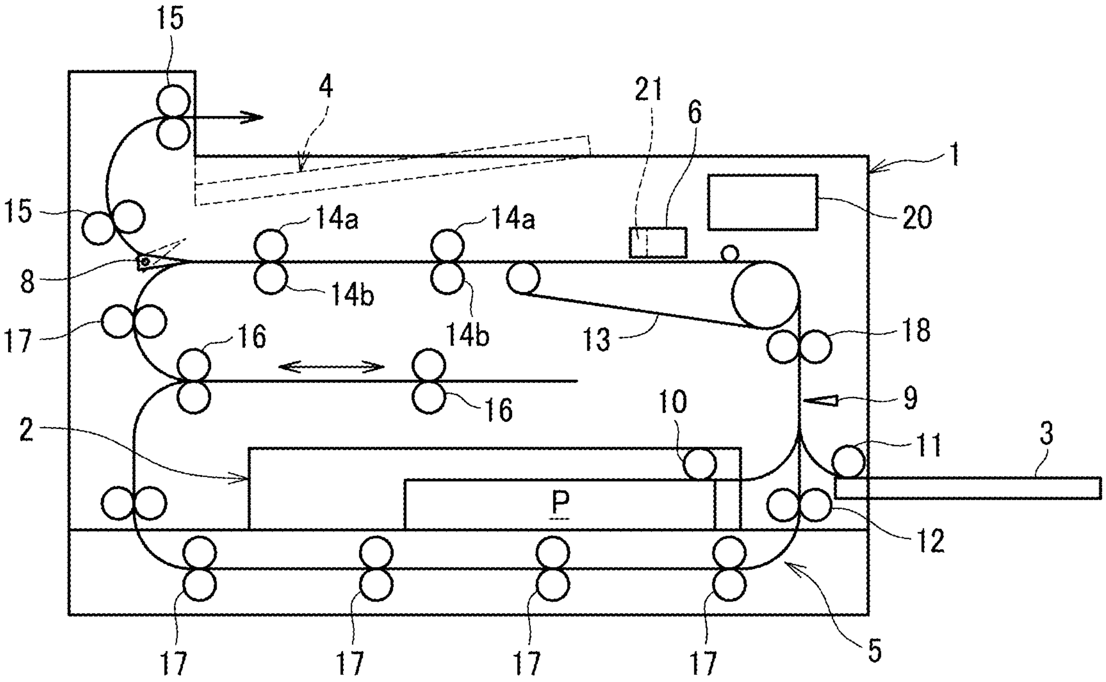
FIG. 1 is a schematic view of the configuration of an inkjet image forming apparatus according to an embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Inkjet Printer

Embodiments of the present embodiment will be described below with reference to the drawings. FIG. 1 is a schematic view of an inkjet printing machine, to which an inkjet printing method is applied, according to an embodiment of the present embodiment. An inkjet printer 1 as an inkjet printing machine includes a sheet feeder 2 that houses sheets (recording sheets) P, a manual sheet feeder 3, a sheet ejection tray 4, and a duplex printing unit 5. In response to a printing request from an external personal computer (PC) connected through a network, a feeding roller 10 separates a sheet P from the sheets P housed in the sheet feeder 2 to convey the sheet P upward in FIG. 1.

The sheet P stops temporarily at the position of a registration sensor 9, and a registration roller 18 aligns the leading end (upper end) of the sheet P. Then, the registration roller 18 starts to feed the sheet P at a predetermined timing synchronized with the timing of output of image data. After reaching a conveying belt 13, the sheet P is further conveyed leftward in FIG. 1 by the conveying belt 13 in a conveyance direction. Then, heads 6 respectively provided with colors of: cyan, yellow, magenta, and black to perform printing on the sheet P on a flat portion (flat conveyance path) of the conveying belt 13.

The sheet P after printing is conveyed by spur gears 14*a* and horizontally conveying rollers 14*b* in the conveyance direction. After the elapse of time necessary to dry the ink, a switching claw 8 makes a switch between a path to the sheet ejection tray 4 and a path to the duplex printing unit 5. For single-sided printing, the switching claw 8 is set to the solid-line side, so that the sheet P is fed to ejecting rollers 15 and then is ejected to the sheet ejection tray 4 in an inverted manner.

For double-sided printing, the switching claw 8 is set to the broken-line side. Thus, after fed to inverting rollers 16, the sheet P returns to invert. Furthermore, the sheet P travels on the path, through duplex feeding rollers 17 and a vertically conveying roller 12, inside the duplex printing unit 5 and then is fed upward in FIG. 1 by the registration roller 18, again. Then, an image is formed on the back face of the sheet P in accordance with a procedure similar to the procedure of formation of the image on the front face.

After formation of the image on the back face of the sheet P, the switching claw 8 is set to the solid-line side, so that the sheet P is fed to the ejecting rollers 15 and then is ejected to the sheet ejection tray 4. Note that, referring to FIG. 1, a manual feeding roller 11, a large-capacity ink cartridge 20, and a sub-tank 21 are provided. Ink is fed from the large-capacity ink cartridge 20 to the sub-tank 21 by an ink supply pump.

Recording Medium Conveyor

Figure 2A:
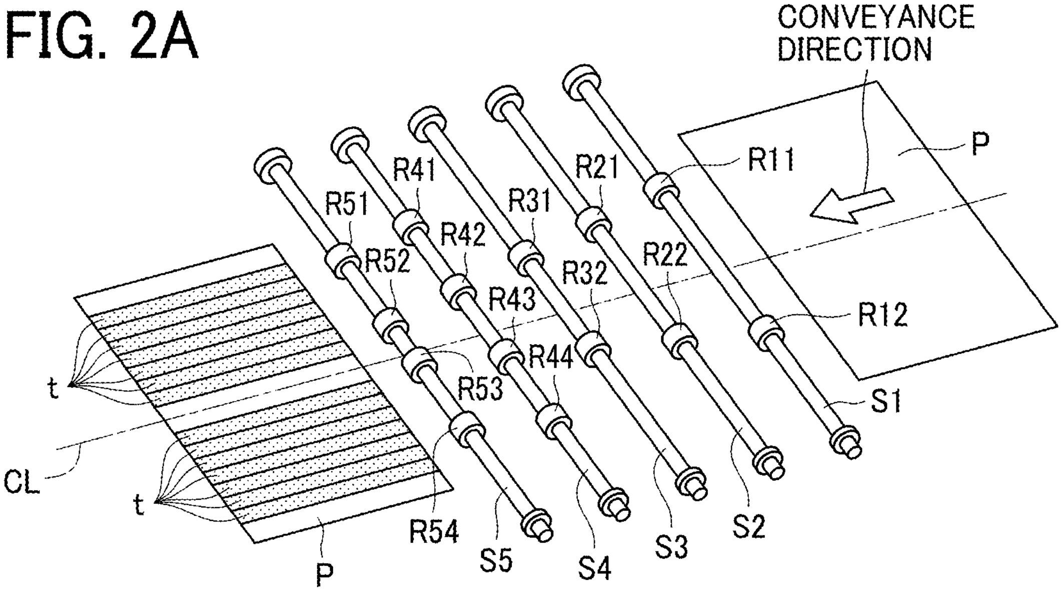
FIG. 2A is a schematic perspective view of a recording medium conveyor according to the present embodiment.
Figure 2A:
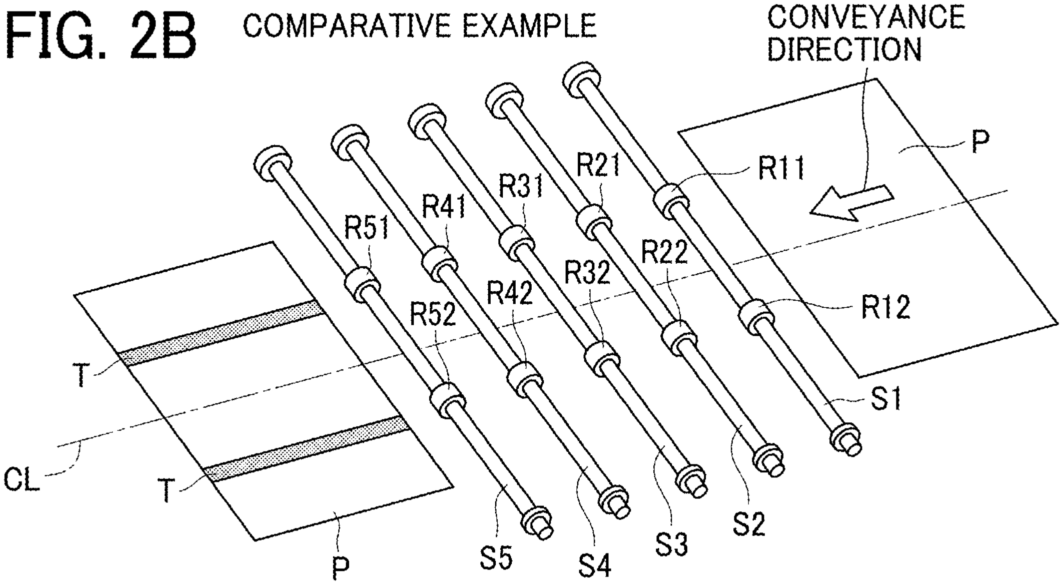

FIG. 2A is a schematic perspective view of a recording medium conveyor according to the present embodiment. FIG. 2B is a schematic perspective view of a recording medium conveyor according to a comparative example. FIGS. 2A and 2B each illustrate a state of conveyance of a sheet P as a sheet-shaped recording medium from right to left by multiple roller shafts S1 to S5.

The roller shafts S1 to S5 are disposed at substantially regular intervals in this order from the upstream side in a conveyance direction.

The roller shafts S1 to S5 each have its axis orthogonal to the conveyance direction of the sheet P and parallel to the width direction of the sheet P. The roller shafts S1 to S5 are each driven by a drive including a motor and gears such that the roller shafts S1 to S5 rotate in the same direction.

The roller shafts S1 to S5 each have multiple rollers R as conveying rollers attached thereto. The multiple rollers R can be made identical in diameter and in size (axial length) or can be made different in diameter and in axial length.

A left roller R11 and a right roller R12 are attached as a lateral pair to the most upstream roller shaft S1. The left roller R11 and the right roller R12 are bilaterally symmetrical about the central line CL of the sheet P.

A left roller R21 and a right roller R22 are attached as a lateral pair to the roller shaft S2 downstream of the roller shaft S1. The left roller R21 and the right roller R22 are bilaterally symmetrical about the central line of the sheet P. The rollers R21 and R22 are located, in terms of axial direction, adjacently to the rollers R11 and R12 inside the rollers R11 and R12 upstream of and closest to the rollers R21 and R22, respectively.

A left roller R31 and a right roller R32 are attached as a lateral pair to the roller shaft S3 downstream of the roller shaft S2 (intermediate in the conveyance direction). The left roller R31 and the right roller R32 are bilaterally symmetrical about the central line of the sheet P. The rollers R31 and R32 are located, in terms of axial direction, adjacently to the rollers R21 and R22 inside the rollers R21 and R22 upstream of and closest to the rollers R31 and R32, respectively.

Left rollers R41 and R42 and right rollers R43 and R44 are attached as a lateral pair to the roller shaft S4 downstream of the roller shaft S3. The left rollers R41 and R42 and the right rollers R43 and R44 are bilaterally symmetrical about the central line of the sheet P.

The inner rollers R42 and R43 are located adjacently to the rollers R31 and R32 inside the rollers R31 and R32 upstream of and closest to the rollers R42 and R43, respectively. The outer rollers R41 and R44 are spaced by one roller outside the most upstream rollers R11 and R12, respectively.

Left rollers R51 and R52 and right rollers R53 and R54 are attached as a lateral pair to the most downstream roller shaft S5. The left rollers R51 and R52 and the right rollers R53 and R54 are bilaterally symmetrical about the central line of the sheet P.

The inner rollers R52 and R53 are located adjacently to the rollers R42 and R43 inside the rollers R42 and R43 upstream of and closest to the rollers R52 and R53, respectively. The outer roller R51 is located in a space for one roller between the rollers R11 and R41, and the outer roller R54 is located in a space for one roller between the rollers R12 and R44.

As described above, the rollers R11 to R54 as the rollers R in FIG. 2A are each located on any of the multiple roller shafts S1 to S5 such that the locations of the rollers R11 to R54 are different in terms of axial direction. Therefore, even if the sheet P has abrasions t due to the rollers R11 to R54, the abrasions t are distributed in the width direction of the sheet P without mutual overlapping (mutual overlaying). Thus, in a case where an image is formed, by inkjetting, on the sheet P downstream of the rollers R11 to R54, the image has no deterioration in quality (no belt-shaped unusual image) even with the abrasions t.

In contrast to this, the recording medium conveyor in FIG. 2B according to the comparative example includes five left rollers R11, R21, R31, R41, and R51 as a straight roller array in the conveyance direction and five right rollers R12, R22, R32, R42, and R52 as a straight roller array in the conveyance direction. Thus, respective abrasions due to the rollers in each of the left and right roller arrays tend to be overlapped (overlaid), leading to formation of a severe roller abrasion T on the sheet P. Therefore, in a case where an image is formed, by inkjetting, onto the sheet P downstream of the rollers R11 to R52, the image is likely to have a large deterioration in quality (belt-shaped unusual image) due to the roller abrasions T.

Recording Medium Conveyor According to Embodiment

Figure 3:
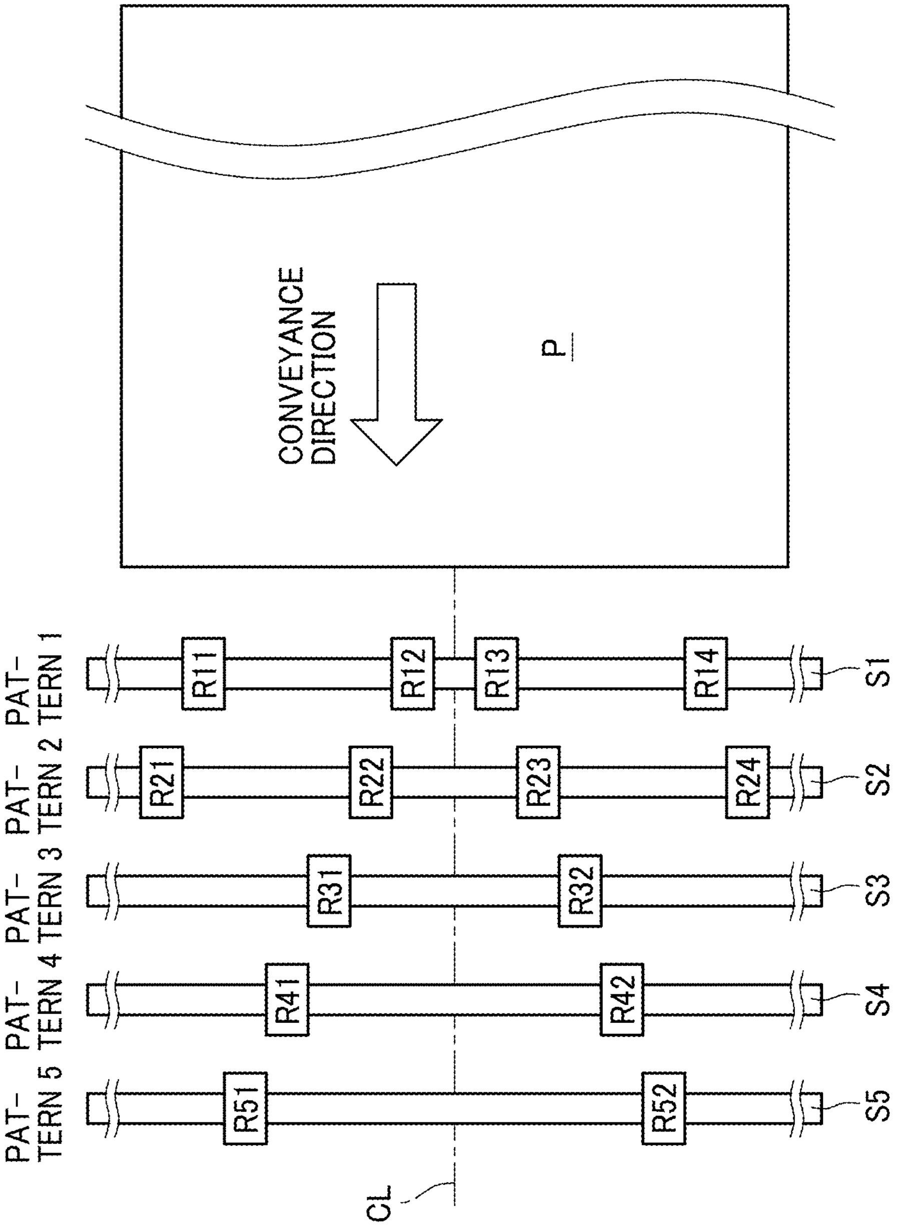
FIG. 3 is a schematic plan view of a recording medium conveyor according to an embodiment of the present embodiment.

FIG. 3 illustrates a recording medium conveyor according to an embodiment of the present embodiment. Five roller shafts S1 to S5 disposed in this order from the upstream side in the conveyance direction have respective different roller arrangement patterns 1 to 5.

The roller arrangement patterns 1 to 5 are not necessarily provided all together. Provided may be a conveyor with any two, any three, or any four of the roller arrangement patterns 1 to 5.

Upper rollers R12, R22, R31, R41, and R51 are disposed like steps gradually away from the central line CL of a sheet P. Lower rollers R13, R23, R32, R42, and R52 are disposed like steps gradually away from the central line CL of the sheet P.

In addition, upper rollers R11 and R21 are disposed like steps gradually away from the central line CL of the sheet P, and lower rollers R14 and R24 are disposed like steps gradually away from the central line CL of the sheet P. That is, such rollers R are disposed without any overlapping when viewed in the conveyance direction. Therefore, in a case where an image is formed, by inkjetting, on the sheet P downstream of the rollers R11 to R52, the image has a minimum deterioration in quality even with any roller abrasion (minimum belt-shaped unusual image).

Note that the roller arrangement patterns 1 to 5 are not necessarily limited to the order in FIG. 3. The patterns 1 to 5 may be disposed in this order from the downstream side or may be disposed in the order of the patterns 3, 4, 5, 1, and 2 from the upstream side. Alternatively, the patterns 1 to 5 may be disposed in any order.

However, adoption of a gradually broadened roller arrangement pattern as in FIG. 3 enables obtainment of a function of stretching the sheet P in its width direction (in the up-down direction in FIG. 3), in addition to an effect of distributing roller abrasions. Such stretching the sheet P in its wide direction as above enables an improvement in the quality of image forming by inkjetting.

- The conveyor includes multiple conveying rollers (R) to convey a sheet in a conveyance direction, and the multiple conveying rollers: arranged in the conveyance direction; and shifted with each other in a width direction orthogonal to the conveyance direction.
- The conveyor includes multiple roller shafts (S1 to S5): arrayed in the conveyance direction; and each having axis extending in the width direction, wherein the multiple roller shafts (S1 to S5) respectively support the multiple conveying rollers (R) arranged on the multiple roller shafts (S1 to S5) with different arrangement patterns of the multiple conveying rollers (R) on the multiple roller shafts (S1 to S5).
- The conveyor includes multiple roller shafts (S1 to S5): arrayed in the conveyance direction; and each having axis extending in the width direction, wherein the multiple roller shafts (S1 to S5) respectively support the multiple conveying rollers (R) arranged on the multiple roller shafts (S1 to S5) with different arrangement patterns of the multiple conveying rollers (R) on the multiple roller shafts (S1 to S5).
- Each of the multiple roller shafts (S1 to S5) has two or more conveying rollers (R), and a distance between the two or more rollers are gradually increased in the conveyance direction.

Flat Conveyance

Figure 4B:
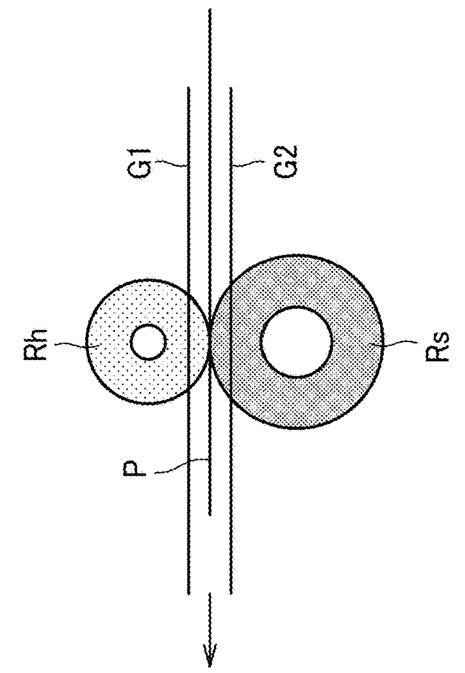
FIG. 4B is a schematic cross-sectional view of the recording medium conveyor.
Figure 4A:
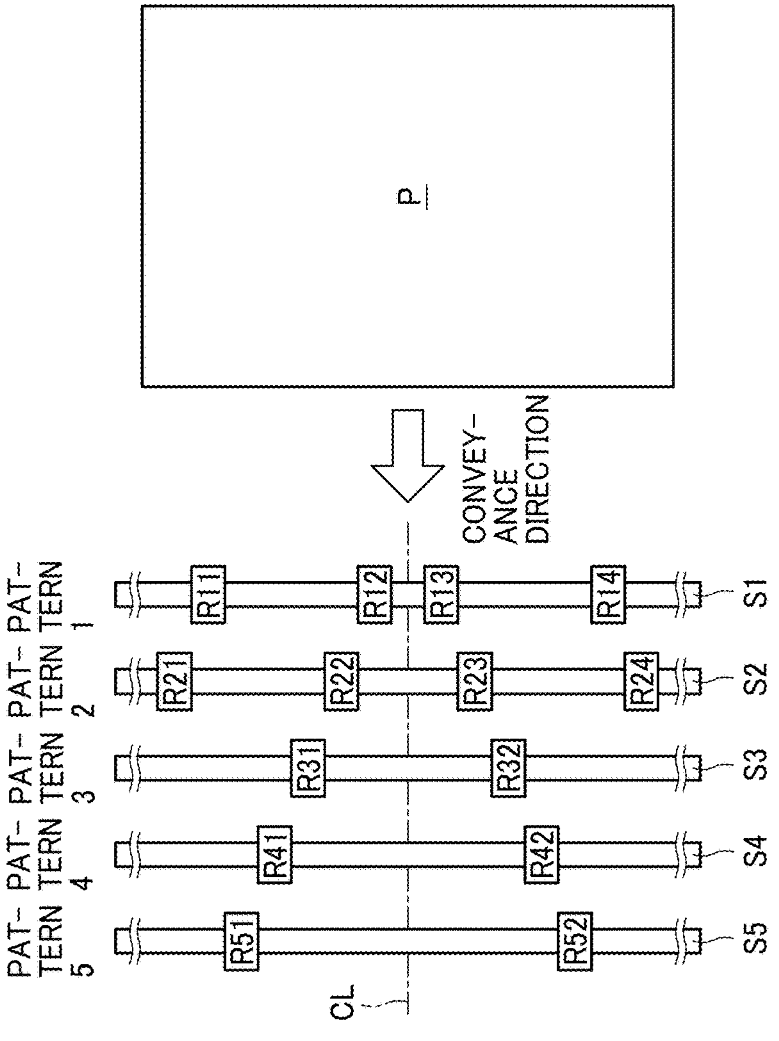
FIG. 4A is a schematic plan view of a recording medium conveyor according to an embodiment for flat conveyance.

FIG. 4A is a schematic plan view of a recording medium conveyor according to an embodiment for flat conveyance. FIG. 4B is a schematic cross-sectional view of the recording medium conveyor. The roller arrangement pattern in FIG. 4A is similar to the roller arrangement pattern in FIG. 3. The flat conveyance in FIGS. 4A and 4B corresponds, for example, to flat conveyance due to the vertically conveying roller 12 in FIG. 1.

As illustrated in FIG. 4B, guides G1 and G2 are disposed, respectively, on the upper side and lower side of a sheet P. The guides G1 and G2 each have a cutout through which a conveying roller protrudes inward. The guides G1 and G2 form a flat conveyance path along which the sheet P is conveyed in the flat conveyance.

In this case, desirably, a hard roller Rh and a soft roller Rs are provided, respectively, as the upper conveying roller (conveying roller on the printing side) and the lower conveying roller. The sheet P receives more severe abrasion damage from the soft roller Rs than from the hard roller Rh. Thus, the soft roller Rs is disposed on the non-printing side (lower side) to inhibit a deterioration in the quality of an image (belt-shaped unusual image).

Each of the multiple conveying rollers includes a pair of: a first roller (hard roller Rh) having a first hardness; and a second roller (soft roller Rs) having a second hardness softer than the first hardness.

The first roller faces a first face of the sheet facing the head 6, and the second roller faces a second face opposite to the first face of the sheet P.

Curved Conveyance

Figure 5B:
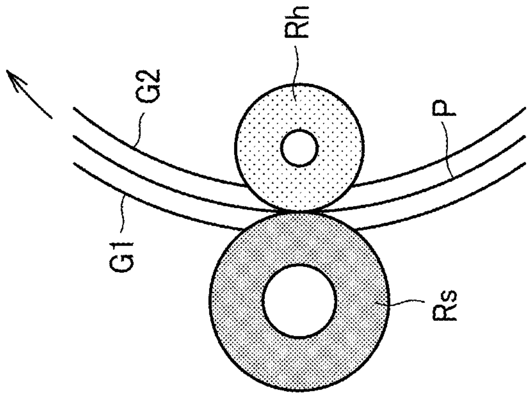
FIG. 5B is a schematic cross-sectional view of the recording medium conveyor.
Figure 5A:
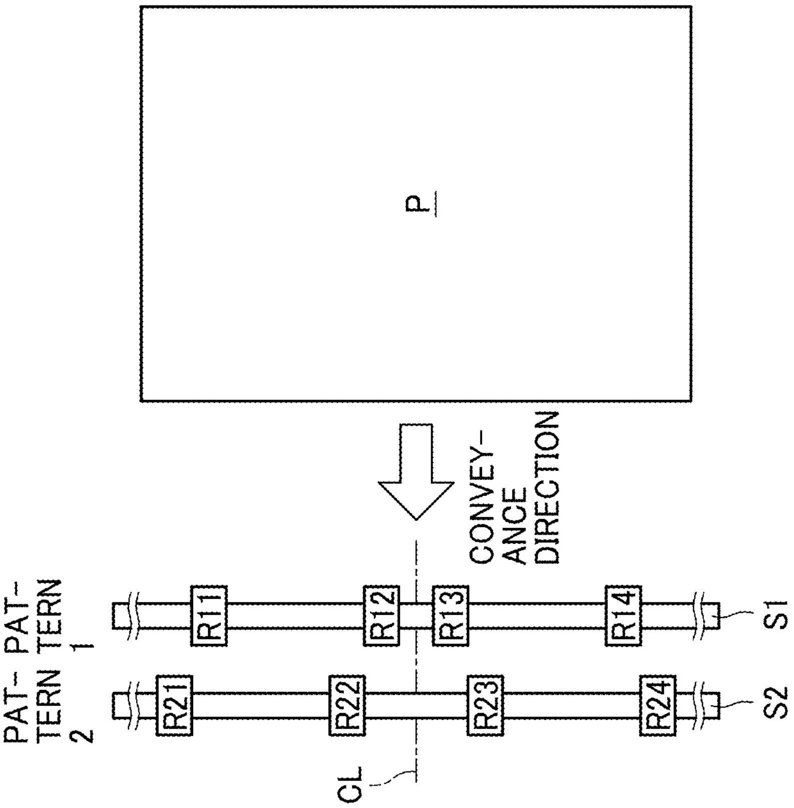
FIG. 5A is a schematic plan view of a recording medium conveyor according to an embodiment for curved conveyance.

FIG. 5A is a schematic plan view of a recording medium conveyor according to an embodiment for curved conveyance. FIG. 5B is a schematic cross-sectional view of the recording medium conveyor. The roller arrangement pattern in FIG. 5A includes the patterns 1 and 2 in FIG. 3.

A gradually broadened roller arrangement based on the patterns 1 and 2 enables obtainment of a function of stretching a sheet P in its width direction (in the up-down direction in FIG. 5A). Such stretching the sheet P in its wide direction as above enables an improvement in the quality of image forming by inkjetting.

The curved conveyance in FIGS. 5A and 5B corresponds, for example, to curved conveyance due to a duplex feeding roller 17 in FIG. 1. As illustrated in FIG. 5B, guides G1 and G2 are disposed inside and outside the sheet P having a curvature. The guides G1 and G2 each have a cutout through which a conveying roller protrudes to the sheet P.

The guides G1 and G2 form a curved conveyance path along which the sheet P is conveyed in the curved conveyance.

In this case, desirably, a hard roller Rh and a soft roller Rs are provided, respectively, as the inner conveying roller (conveying roller on the printing side) and the outer conveying roller. The sheet P receives more severe abrasion damage from the soft roller Rs than from the hard roller Rh. Thus, the soft roller Rs is disposed on the non-printing side (outer side) to inhibit a deterioration in the quality of an image (belt-shaped unusual image).

The present embodiment has been specifically described above with some embodiments. However, the present embodiment is not limited to the above embodiments and thus various modifications can be made without departing from the scope of the technical idea in the claims. For example, such a conveying roller arrangement pattern as described above can be achieved with at least three rollers. For example, such a conveying roller arrangement pattern as described above can be achieved with three rollers R that are two rollers on the upstream side in the conveyance direction and a single roller on the downstream side in the conveyance direction.

Alternatively, such a conveying roller arrangement pattern as described above can be achieved with three rollers R that are a single roller on the upstream side in the conveyance direction and two rollers on the downstream side in the conveyance direction. Then, the two rollers are disposed on both sides in the width direction of a recording medium. In addition to the three rollers, additional rollers may be appropriately provided to the roller shafts thereof or a roller shaft different from the roller shafts. The present embodiment is not limited to an inkjet image forming apparatus and thus can be applied to an electrophotographic image forming apparatus or a recording medium conveyor therefor.

The conveyor may include a flat conveyance path, and the multiple conveying rollers include three or more rollers to convey the sheet along the flat conveyance path.

The conveyor may include a curved conveyance path, and the multiple conveying rollers include three or more conveying rollers to convey the sheet along the curved conveyance path.

According to the present embodiment, a recording medium can be inhibited from having overlaid roller abrasions for an improvement in the quality of an image.

Supplementary Notes

Supplementary notes of preferred aspects of the present embodiment will be given below.

Aspect 1

According to Aspect 1, a recording medium conveyor includes multiple conveying rollers disposed in a conveyance direction of a sheet-shaped recording medium, the multiple conveying rollers not overlapping each other in the conveyance direction of the sheet-shaped recording medium.

Aspect 2

According to Aspect 2, the recording medium conveyor of Aspect 1 further includes multiple roller shafts disposed in the conveyance direction, the multiple roller shafts having respective axes extending in a width direction of the sheet-shaped recording medium orthogonal to the conveyance direction, in which the multiple conveying rollers is supported by the multiple roller shafts in different arrangement patterns.

Aspect 3

According to Aspect 3, in the recording medium conveyor of Aspect 1 or 2, the multiple conveying rollers includes a pair of a hard roller and a soft roller different in hardness.

Aspect 4

According to Aspect 4, in the recording medium conveyor of Aspect 3, the hard roller is disposed on a side of location of a face for printing of the sheet-shaped recording medium and the soft roller is disposed on a side of location of a face for non-printing of the sheet-shaped recording medium.

Aspect 5

According to Aspect 5, in the recording medium conveyor of any one of Aspects 1 to 4, the multiple conveying rollers includes three conveying rollers configured to bring the sheet-shaped recording medium in flat conveyance.

Aspect 6

According to Aspect 6, in the recording medium conveyor of any one of Aspects 1 to 4, the multiple conveying rollers includes three conveying rollers configured to bring the sheet-shaped recording medium in curved conveyance.

Aspect 7

According to Aspect 7, an image forming apparatus includes the recording medium conveyor of any one of Aspects 1 to 6.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A conveyor, comprising:

a flat conveyance path;

a curved conveyance path;

a first plurality of conveying rollers to convey a sheet along the flat conveyance path in a conveyance direction; and a second plurality of conveying rollers to convey the sheet along the curved conveyance path, wherein a number of conveying rollers in the first plurality of conveying rollers decreases along the flat conveyance path in the conveyance direction, a number of conveying rollers in the second plurality of conveying rollers remains unchanged along the curved conveyance path in the conveyance direction, the first plurality of conveying rollers are shifted with respect to each other in a width direction orthogonal to the conveyance direction, and the second plurality of conveying rollers are shifted with respect to each other in the width direction.

2. The conveyor according to claim 1, further comprising:

multiple roller shafts arrayed in the conveyance direction, each roller shaft of the multiple roller shafts having an axis extending in the width direction, wherein the multiple roller shafts respectively support the first plurality of conveying rollers and the second plurality of conveying rollers arranged on the multiple roller shafts with different arrangement patterns of conveying rollers on the multiple roller shafts.

3. The conveyor according to claim 2, wherein each of the multiple roller shafts has two or more conveying rollers, and a distance between the two or more rollers are gradually increased in the conveyance direction.

4. The conveyor according to claim 2, wherein each of the multiple roller shafts has two or more conveying rollers, and the two or more rollers are gradually disposed away from a central line of the sheet in the conveyance direction.

5. The conveyor according to claim 2, wherein each of the conveying rollers of the first plurality of conveying rollers and the second plurality of conveying rollers includes a pair of:

a first roller having a first hardness; and a second roller having a second hardness softer than the first hardness.

6. The conveyor according to claim 5, wherein the first roller faces a first face of the sheet facing a head, and the second roller faces a second face opposite to the first face of the sheet.

7. The conveyor according to claim 1, wherein the first plurality of conveying rollers includes three or more rollers.

8. The conveyor according to claim 1, wherein the second plurality of conveying rollers includes three or more conveying rollers.

9. An image forming apparatus comprising:

the conveyor according to claim 1 and a head to discharge a liquid on the sheet conveyed by the conveyor.

10. The conveyor according to claim 1, further comprising:

a first guide disposed on an upper side of the sheet; and a second guide disposed on a lower side of the sheet, wherein the first guide and the second guide form the flat conveyance path.

11. The conveyor according to claim 10, wherein the first guide and the second guide each have a cutout through which a corresponding conveying roller of the first plurality of conveying rollers protrudes inward.

12. The conveyor according to claim 1, further comprising:

a first guide disposed inside of the sheet; and a second guide disposed outside of the sheet, wherein the first guide and the second guide form the curved conveyance path, and the first guide and the second guide have a curvature.

13. The conveyor according to claim 12, wherein the first guide and the second guide each have a cutout through which a corresponding conveying roller of the second plurality of conveying rollers protrudes to the sheet.

14. The conveyor according to claim 1, wherein at least one of the first plurality of conveying rollers and the second plurality of conveying rollers are arranged to stretch the sheet in the width direction.

15. The conveyor according to claim 1, further comprising multiple roller shafts supporting the first plurality of conveying rollers and the second plurality of conveying rollers, wherein the multiple roller shafts are each driven to rotate in a same direction.

16. The conveyor according to claim 1, wherein the first plurality of conveying rollers and the second plurality of conveying rollers each include left rollers and right rollers that are bilaterally symmetrical about a central line of the sheet.

17. The conveyor according to claim 1, wherein at least one of the first plurality of conveying rollers and the second plurality of conveying rollers includes rollers having different diameters and different axial lengths.

18. The conveyor according to claim 1, wherein the first plurality of conveying rollers includes three rollers, and two rollers of the three rollers are disposed on an upstream side in the conveyance direction and a single roller of the three rollers is disposed on a downstream side in the conveyance direction.

19. The conveyor according to claim 1, wherein the first plurality of conveying rollers includes three rollers, and a single roller of the three rollers is disposed on an upstream side in the conveyance direction and two rollers of the three rollers are disposed on a downstream side in the conveyance direction.

20. The conveyor according to claim 1, wherein at least one of the first plurality of conveying rollers and the second plurality of conveying rollers includes an outer roller located in a space for one roller between an upstream roller and a downstream roller.

* * * * *